United States Patent Office 3,846,286
Patented Nov. 5, 1974

3,846,286
HYDRODESULFURIZATION CATALYST
John Joseph Phillipson, Stockton-on-Tees, England, assignor to Imperial Chemical Industries Limited, London, England
No Drawing. Continuation of abandoned application Ser. No. 22,046, Mar. 23, 1970. This application Apr. 4, 1973, Ser. No. 347,726
Claims priority, application Great Britain, Apr. 10, 1969, 18,387/69
Int. Cl. B01j 11/06, 11/22; C10g 23/02
U.S. Cl. 208—216  8 Claims

ABSTRACT OF THE DISCLOSURE

A catalyst precursor composition comprising alumina, a Group VIB metal oxide and a Group VIII metal oxide is in the form of compressed shapes having at the same time a low bulk density e.g. 0.37 and high mechanical strength e.g. 66 lbs. vertical crushing strength. The catalyst derived from the composition is highly active and maintains its activity for long periods when used in hydrodesulphurising hydrocarbons.

---

This is a continuation of application Ser. No. 22,046 filed Mar. 23, 1970, now abandoned.

This invention relates to a heterogeneous catalyst having a low bulk density.

Although heterogeneous catalytic processes have been operated on an industrial scale for several decades and an independent industry has grown up which specialises in making catalysts, it has long been recognized that the cost of catalysts contributes significantly to the prices of industrial products; and consequently research aimed at decreasing such cost has been a pre-occupation of catalyst manufacturers. An attractive line of research has been by way of decreasing the bulk density of catalyst, since often the cost of catalyst is proportional to its weight but the rate at which chemical reaction takes place over it is proportional to its volume. Consequently the extrusion method of making catalyst shapes has been used whenever possible, since the method of wet- or dry-compression employs much greater compressive forces than extrusion and has been found to produce catalyst of higher density. However the mechanical strength of particles made by extrusion is for some catalysts too low to permit satisfactory industrial use; and it is unsatisfactory to seek low bulk density by employing compression with inadequate force, since then again mechanical strength is too low.

We have devised a shaped catalyst precursor containing an oxide of a metal from Group VIB of the Periodic Table and alumina, together with other constituents such as Group VIII metal oxides, having an especially favourable combination of bulk density and mechanical strength, and a method of making it which depends on using the correct alumina support starting material and the correct shaping conditions.

In this specification the Periodic Table is that given on page B-3 of the Handbook of Chemistry and Physics, 48th Edition, 1967.

In this specification the invention will be defined in terms of precursor composition in which the constituents are present as oxides, and percentages by weight are, unless otherwise stated, expressed as a proportion of the constituents present which are not volatile at 650° C. The invention includes also catalytically active compositions derived from such precursors, for example by reduction or sulphiding or both. The latter operations are usually performed by the catalyst-user, not by the catalyst manufacturer.

The invention provides a catalyst precursor composition which comprises alumina, a metal oxide from Group VI-B of the Periodic Table and an oxide of a Group VIII base metal and is characterized by being in the form of compressed shapes having a density of under 1.2 and a mean crushing strength of at least 280 p.s.i.

The density referred to in the previous paragraph is that of the individual shapes and is expressed in grams per cubic centimetre or equivalent units. The above mentioned density of 1.2 corresponds to a bulk density of about 0.7, for the shapes (preferably cylinders) in which catalysts are normally manufactured.

Preferred catalyst precursor compositions according to the invention have a density under 0.85, that is, a bulk density under 0.50. The mean crushing strength can be at least 1400 p.s.i., especially more than 4200 p.s.i.

The invention provides especially such catalyst precursor compositions in which the proportion of alumina is more than 50%, especially more than 80% by weight. This is an important feature of the invention since in the art of making catalysts it is often found difficult to make shapes containing so much alumina without incurring excessive density (owing to the high pressures necessary) or low mechanical strength.

The catalyst precursor composition can contain other oxides and oxide mixtures of the difficultly-reducible type, such as Group IIA oxides, silica, aluminosilicates such as clays, and also alkali metal compounds. These are preferably present in a total quantity not more than about half the quantity of alumina present. Preferably a Group IIA metal oxide is present and this is very suitably magnesia: the proportion of such an oxide is preferably 1–10%.

The content of Group VI-B metal oxide (calculated as the oxide $MO_3$) is typically in the range 1–20% by weight; and that of the base metal typically 0.5 to 15% by weight calculated as FeO, CoO or NiO. The invention is not limited to any particular extent of compound formation between the Group VI and Group VIII oxide constituents.

We have found that our preferred precursor compositions such as described in our provisional specification contain alumina in a particular crystal structure, namely in the form of sheets of fine crystallites. These are described more fully below in relation to a preferred alumina starting material for making the catalyst, but it appears that this structure is maintained to a substantial extent in the precursor composition and the catalyst, despite the physical and chemical treatments involved in making the composition and catalyst. It is preferred that all the alumina present should be in this crystal structure or in forms resulting from transformations of it occurring in the preparation of the precursor or catalyst.

The invention provides also a method of making a catalyst precursor composition which comprises mixing a hydrated alumina having a bulk density less than 0.5, especially less than 0.3, with a compound of a Group VI–B metal and a compound of a Group VIII metal, both of which are thermally decomposable to the oxide, and pelleting the mixture under a pressure in the range 1 to 30 tons per square inch.

The starting hydrated alumina is preferably a form of alpha alumina monohydrate (böhmite). (These names are used as defined in "Alumina Properties," published by the Aluminium Corporation of America, 1960). It will be appreciated that it is often not convenient to obtain hydrated aluminas which are of stoichiometric composition or contain only one crystalline modification; preferably however the starting alumina is at least 50% alpha monohydrate. We have found that the preferred starting alumina described in our provisional specification is a poorly crystalline böhmite (which may be referred to as pseudoböhmite) having possibly some loosely bound water and being in the form of thin sheets made up of fine crystallites; the thickness of these sheets appears to be very suitably of the order of 20–30 Angstrom units; and the length of the crystallites in the plane of the sheets appears to be very suitably up to 60 Angstrom units. It is not necessary for the crystallites in the sheets to be perfectly aligned; and indeed good results are obtained using alumina sheets which are considerably "crumpled" in both dimensions of the sheet. These data as to the structure of the aluminas are based chiefly on electron microscopy and on X-ray diffraction (line-broadening) measurements.

It is within the scope of the invention to use a mixture of aluminas of different types but it is preferred to use only the above-described type.

The bulk density of the starting hydrated alumina is determined while it is in powder form. The granular form in which such an alumina hydrate is obtained is crushed to pass a 7 B.S.S. sieve but to be retained by an 18 B.S.S. sieve, then the volume of a sample of about 50 ml. is measured in a graduated cylinder after tapping the cylinder until no further settling of the powder occurs. The sample is weighed after drying at 120° C. It will be appreciated that this sieve range is for the purpose of affording a standardised test and does not limit the particle-size range to be used in the method of the invention.

The starting alumina can be made by double decomposition of an aluminium salt with an alkali metal precipitant such as sodium hydroxide or sodium carbonate or of an alkali metal aluminate with an acid. The precipitate should be mainly alpha alumina monohydrate, in the form of flocculated fine particles. Precipitation conditions producing alumina gels are preferably avoided. Preferably precipitation takes place in the presence of divalent anions. Instead of an alkali metal precipitant an ammonia or ammonium carbonate precipitant may be used; and the acid reacted with an alkali metal aluminate may be carbonic acid or an aluminium salt. At the end of the double decomposition there should preferably be an excess of alkali, up to about 3 pH units. The precipitate is preferably aged at 50–100° C. for 0.25–5 hours and, in any event, should finally be washed substantially free of electrolytes. It can then be dried but is preferably not heated about 350° C. before being used in making the composition. The Group VI–B metal compound is preferably one in which the metal is hexavalent, such as an acid or amonium salt. The Group VIII metal is most conviently introduced as the nitrate, but other salts can be used, provided they do not give rise to undesirable impurities.

The mixing of the ingredients of the catalyst composition is preferably effected in the presence of water, preferably with free ammonia also present. The mixture is dried at e.g. 120° C., then calcined as described below. It is then ready for crushing and then compression into shapes, e.g. by pelleting.

The pelleting pressure is believed to be unusually low for catalysts containing substantial proportions of alumina; by way of comparison it may be mentioned that a catalyst having the composition described in the Example but made from alumina trihydrate of bulk density 1.3 the pressure would need to be about 35 tons per square inch. Within the broad range defined above it is preferred to operate in the range 5–20 tons per square inch in order to produce catalyst precursor compositions of wide general utility.

Before or after the pelleting operation the mixture of catalyst constituents is preferably calcined at a temperature in the range 250–600° C. for a period sufficient to convert the Group VI and Group VIII compounds and hydrated alumina at least partly to oxides. A suitable calcination before pelleting takes 3 hours at 450° C. It appears that a calcination after pelleting produces a considerable increase in the mechanical strength of the pellets, and is therefore preferably carried out if it is desired to make pellets of such low bulk density that, when first made, they have a barely acceptable mechanical strength.

Catalysts made from precursor compositions according to the invention are useful in a considerable number of processes, for example, hydrogenolytic removal of sulphur, oxygen or nitrogen from hydrocarbons, selective hydrogenation of acetylenes in olefines, carbon monoxide conversion and steam/hydrocarbon reactions.

The invention provides especially the first-named of the above-processes, called also "hydrodesulphurisation," in which a hydrocarbon feedstock containing sulphur derivatives of hydrocarbons (e.g. 5–1000 p.p.m. w./v. calculated as sulphur), is passed with hydrogen over the catalyst at a temperature in the range 300–450° C. The sulphur is thereby converted to $H_2S$ which can be easily removed by means of alkali or zinc oxide, iron oxide or manganese oxide, or by condensing the hydrocarbon if its boiling point is not too low. A suitable hydrocarbon feedstock is a naphtha boiling over the range 30–220° C. The process is also applicable to higher-boiling feedstocks, such as heavy naphthas, kerosenes and gas-oils.

For this process the catalyst preferably contains the oxide of a Group IIA metal, especially magnesium oxide (e.g. 1–10%), since this lengthens the life of the catalyst by decreasing the tendency of the hydrocarbon to decompose to give carbon.

EXAMPLES OF CATALYST PREPARATION

Alumina monohydrate was made by adding cold 2N sodium hydroxide solution to a stirred solution of 2N aluminium sulphate at 70° C. until the pH of the slurry expressed for a temperature of 20° C. was 9.5. The slurry was stirred for 1 hour at 70° C., then filtered and washed to an alkali content of 0.2% as $Na_2O$. The filter cake was dried at 120° C. for 24 hours. The dried product had the approximate composition $Al_2O_3 \cdot 1.4H_2O$. It consisted substantially of alpha alumino monohydrate in a poorly crystalline "crumpled-sheet" form, the sheets being about 20–30 A. thick, 13 A. apart and being made up of crystallites of length mainly less than 60 A. Its bulk density, measured as described above, was 0.7 g./cc.

A sample of this alumina monohydrate (180 g.) was crushed to pass a 12 B.S.S. sieve. To it was added with thorough mixing a solution (530 ml.) containing cobalt nitrate hexahydrate (20 g.), magnesium nitrate hexahydrate (46.5 g.), molybdic acid $MoO_3 \cdot 2H_2O$ (26.0 g.) and ammonia (150 ml. of 0.880 S.G. aqueous solution). The mixture was dried at 120° C. for 24 hours, calcined at 450° C. for 3 hours, then crushed to pass a 12 B.S.S. sieve and mixed with 1% w./w. of graphite. Four samples (A–D) were then pelleted by means of a Manesty rotary compression pelleting machine at pelleting pressures in the range 12–17 tons per square inch. The Table shows the vertical crushing strength (VCS), bulk densities and percentage attrition loss of these pellets, which were in the form squat cylinders 5.4 x 3.6 mm.

TABLE 1

| Catalyst | Pelleting pressure (tons per sq. inch) | V.C.S. (pounds) Mean | V.C.S. (pounds) Range | Bulk density (kg. per l.) | Percent attrition loss (tumbling loss) |
|---|---|---|---|---|---|
| A | Ca. 12 | 14 | (4–40) | 0.29 | 4.6 |
| B | Ca. 14 | 66 | (25–100) | 0.37 | 4.2 |
| C | Ca. 15 | 150 | (90–200) | 0.47 | 2.3 |
| D | Ca. 17 | 186 | (130–250) | 0.5 | 1.3 |

The percentage composition of the pellets by weight was

MgO _____ 3
$MoO_3$ _____ 12
MgO _____ 3
Loss at 650° C. _____ 2.3
Balance $Al_2O_3$ When a catalyst of the same composition was made by dry-mixing the alumina monohydrate, magnesium oxide and molybdic acid with a small quantity of bentonite and soluble starch, then adding cobalt nitrate solution, pug-milling, extruding and calcining, the bulk density of the resulting catalyst particles was 0.7 to 0.72, which is much higher than that of the pelleted catalysts according to the invention. At the same time the crushing strength of the extruded particles was only 10 pounds. This catalyst is referred to below as catalyst E.

A batch of pelleted catalyst similar to the first-mentioned batch except that no magnesia was present was found to have the same favourable combination of low bulk density and good mechanical strength.

EXAMPLES OF DESULPHURISATION USING THE CATALYST (a) Vaporised n-heptane containing 100 p.p.m. w./v. of sulphur added as thiophene was passed with hydrogen (hydrogen: hydrocarbon mole ratio 0.25) at a liquid heptane space velocity of 0.75 hour$^{-1}$ over catalysts A–D at 390° C., atmospheric pressure. After 100 hours' operation the effluent vapour was condensed and analysed for sulphur. Table 2 shows the percentage of sulphur removed, in comparison with control catalyst E mentioned above, and with control catalyst F which is an extruded catalyst similar to E but made using alpha alumina trihydrate of bulk density 1.3: the bulk density of F was 0.85 and its crushing strength 12 pounds.

TABLE 2

| Catalyst | A | B | C | D | E | F |
|---|---|---|---|---|---|---|
| Percent thiophene removal | 35 | 35 | 43 | 51 | 48 | 50 |

It is evident that catalysts C and D are substantially equal in activity to catalysts E and F.

(b) Two catalysts, D and G, G being a magnesia-free version of D, were tested as described in the previous paragraph; percentage sulphur removal levels after 100 and 260 hours' operation are shown in Table 3.

TABLE 3

| Catalyst | Bulk density | MVCS (pounds) | Percent thiophene removal 100 hours | Percent thiophene removal 260 hours |
|---|---|---|---|---|
| D | 0.51 | 186 | 51 | 52 |
| G | 0.51 | 187 | 50 | 35 |

It is evident that the magnesia-containing catalyst D maintains its activity more effectively than catalyst G.

(c) Catalyst C was compared with equal volumes of catalysts E and F under the following conditions:

Temperature _____ 370° C.
Pressure _____ 450 p.s.i.g.
Space velocity _____ 1 liquid volume of feedstock per unit volume of catalyst per hour.
H$_2$/hydrocarbon ratio _____ 0.25.
Feedstock _____ Naphtha boiling in the range 30–170° C. and containing 100–110 p.p.m. w./v. of sulphur added as thiophene (the naphtha had been previously desulphurised).
Time before voluntary shutdown: _____ 3 weeks (E and F).

Table 4 shows that each is equally effective in removing thiophene.

TABLE 4

| Catalyst | F | E | C |
|---|---|---|---|
| Mean percent thiophene removed | 98.8 | 98.6 | 98.8 |
| Bulk density | 0.85 | 0.71 | 0.47 |

The test of catalyst C was prolonged to 3 months and showed no loss in activity. After 3 months' further operation of catalyst C, during part of which various feedstocks containing up to 1000 p.p.m. of sulphur were treated, the catalyst still showed no loss in activity and had also increased slightly in mechanical strength.

What is claimed is:

1. A catalyst precursor composition which consists essentially of at least 50% by weight alumina at least partly in the form of sheets of fine crystallites, said sheets being of the order of 20–30 Angstrom units in thickness and up to 60 Angstrom units in length in the plane of the sheets, 1–20% by weight of a metal oxide from Group VIB of the Periodic Table, 0.5–15% by weight of a base metal oxide from Group VIII of the Periodic Table, and 1–10% of a Group II–A metal oxide, said composition being further characterised by being in the form of compressed shapes having a density under 1.2 and a mean crushing strength of at least 280 p.s.i.

2. A composition according to Claim 1 having a density under 0.85.

3. A composition according to Claim 1 having a mean crushing strength of at least 4200 p.s.i.

4. A method of making a catalyst precursor composition according to claim 1 which comprises mixing a hydrated alumina having a bulk density less than 0.5 with an aqueous solution of a compound of a Group VI–B metal, a compound of a Group VIII base metal and a compound of a Group II–A metal, each of which compounds is thermally decomposable to the oxide, said alumina being a poorly crystalline böhmite having possibly some adsorbed water and being in the form of thin sheets made up of fine crystallites of the order of 20–30 Angstrom units thickness and up to 60 Angstrom units length in the plane of the sheets, drying the mixture, and either pelleting the dried mixture under a pressure in the range 1 to 30 tons per square such and calcining the pelleted mixture or calcining the dried mixture and pelleting the calcined mixture under a pressure in the range 1 to 30 tons per square inch.

5. A method according to Claim 4 in which the mixing of the ingredients is effected in the presence of water, whereafter the mixture is dried and pelleted.

6. A method according to Claim 4 in which a calcination is effected after pelleting.

7. A catalyst whenever produced, by reduction or sulphiding or both, from a precursor composition according to Claim 1.

8. A process of hydrodesulphurisation of a hydrocarbon feedstock over a catalyst according to Claim 7.

References Cited
UNITED STATES PATENTS 2,993,868  7/1961  McEvoy _____ 252—465
3,112,257  11/1963  Douwes et al. _____ 208—216
3,242,101  3/1966  Erickson et al. _____ 252—465
3,278,421  11/1966  Gatsis _____ 208—216 X DANIEL E. WYMAN, Primary Examiner
W. J. SHINE, Assistant Examiner U.S. Cl. X.R.
252—465, 466 J, 466 PT